(No Model.)
W. & F. BROCKHAUSEN.
ADJUSTABLE BEARING FOR CONNECTING RODS OR LINKS.
No. 522,335. Patented July 3, 1894.
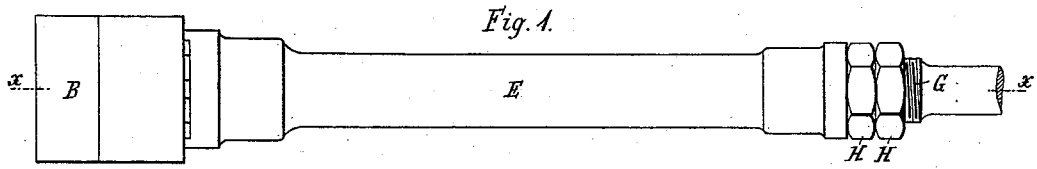
Fig. 1.
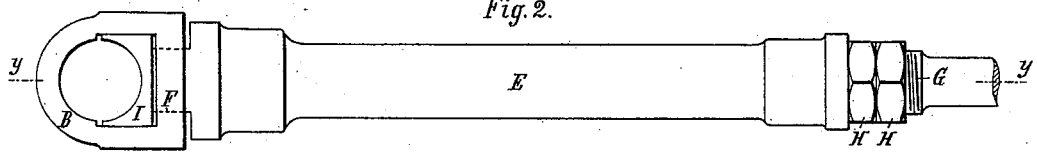
Fig. 2.
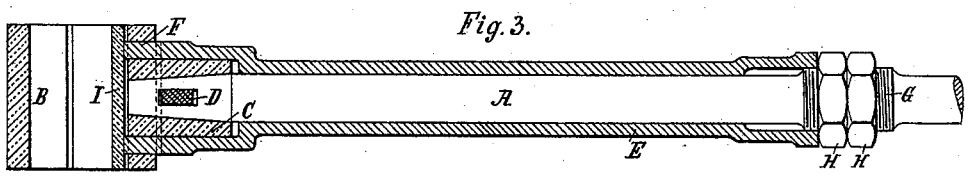
Fig. 3.
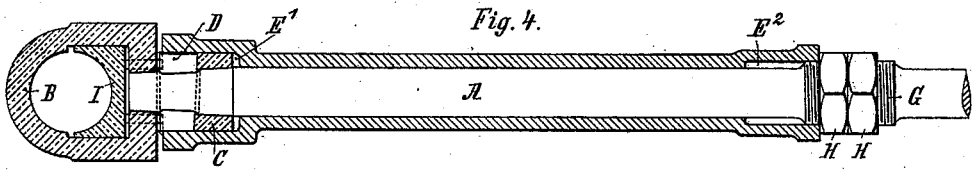
Fig. 4.
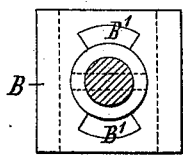
Fig. 5.
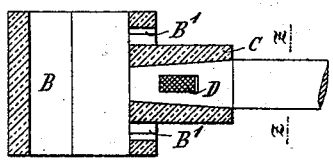
Fig. 6.
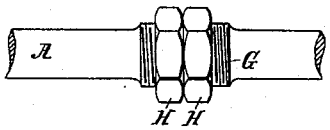
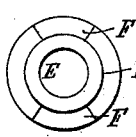
Fig. 7.
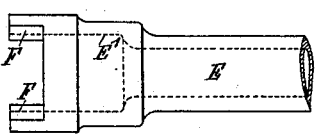
Fig. 8.
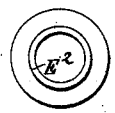
Fig. 9.
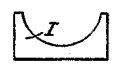
Fig. 10.
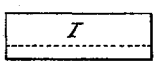
Fig. 11.
Fig. 13.
Fig. 12.
WITNESSES:
Charles Schroeder
H. Villard Griffiths
INVENTORS:
W. Brockhausen
F. Brockhausen
by Goepel & Ruegener
ATTORNEYS.

UNITED STATES PATENT OFFICE.

WILHELM BROCKHAUSEN AND FRIEDRICH BROCKHAUSEN, OF RIGA, RUSSIA.

ADJUSTABLE BEARING FOR CONNECTING RODS OR LINKS.

SPECIFICATION forming part of Letters Patent No. 522,335, dated July 3, 1894.

Application filed July 8, 1893. Serial No. 479,917. (No model.) Patented in Belgium June 7, 1893, No. 104,995.

*To all whom it may concern:*

Be it known that we, WILHELM BROCKHAUSEN and FRIEDRICH BROCKHAUSEN, subjects of the Emperor of Germany, and residents of Riga, in the Empire of Russia, have invented certain new and useful Improvements in Adjustable Bearings for Connecting Rods or Links, (for which we have obtained Letters Patent in Belgium, dated June 7, 1893, No. 104,995,) of which the following is a specification.

The object of this invention is to provide a new and improved adjustable bearing for connecting-rods and links, which is so constructed that the bearing-blocks or pieces at that end of a connecting-rod or link which is not readily accessible can be adjusted from a point on said connecting-rod located a greater or less distance from said bearing-blocks, that is, from a point that is readily accessible.

In the accompanying drawings, Figure 1 is a plan view of a part of a connecting-rod provided with our improvement. Fig. 2 is a side view of the same. Fig. 3 is a horizontal sectional view, on the line $y$, $y$, of Fig. 2. Fig. 4 is a vertical longitudinal sectional view, on the line $x$ $x$, of Fig. 1. Fig. 5 is a vertical transverse sectional view, on the line $z$ $z$, Fig. 6. Fig. 6 is a horizontal sectional view of the connecting-rod alone. Fig. 7 is a front end view of the sleeve on the connecting rod. Fig. 8 is a side view of the sleeve, parts being broken out. Fig. 9 is a rear end view of the sleeve. Figs. 10, 11 and 12 are respectively an end view, a side view and a plan view of one of the bearing blocks, and Fig. 13 is an end view of another bearing block, that may be used in said bearing.

Similar letters of reference indicate corresponding parts.

The rod A is connected with a head B by means of a key D, that passes through the neck C of the head and through a tapered end of the rod A inserted into said neck. The rod A is provided at an accessible point, a greater or less distance from that end of the rod connected with the head B, with a raised screw-threaded part G for receiving the adjustable nuts H.

The head B is shaped to receive the bearing block I and an additional block I', shown in Fig. 13. The head B has two segmental openings B', B', through which the two lugs F of the sleeve E can pass and slide longitudinally, said sleeve E surrounding the rod A loosely and in such a manner that it can slide in the direction of its length on said rod.

The sleeve F is provided at one end with a socket E' for receiving the neck C of the head B, and at the opposite end the sleeve E has a similar socket E², into which the screw-thread can pass when the sleeve is shifted on the rod A for the purpose of inserting the key D or removing the same.

The above mentioned lugs F F at one end of the sleeve E, are so arranged that they pass through the openings B' B' of the head, and their straight end surfaces rest against the bearing block I, as shown in Fig. 3. By drawing up the nuts H the sleeve E can be moved on the rod A in a direction toward the head B, whereby the lugs F bear against the bearing-block I and tighten the same upon the journal or pin. The bearing block can thus be adjusted even if the bearing itself is located at an accessible point of the rod.

Having thus described our invention, we claim as new and desire to secure by Letters Patent—

1. The combination, with a connecting-rod or link, of a bearing-head on the end of the same, a bearing-block in said head, a sleeve mounted loosely on said rod and having lugs that can act on said block, and nuts on the threaded part of the rod, which nuts serve for shifting the sleeve in the direction of its length, substantially as set forth.

2. The combination, of a rod provided with a raised screw-threaded part, a head provided with a neck for receiving one end of said rod, a key passed through said neck and the end of the rod, a sliding bearing-block in the head, a sleeve mounted to slide on the rod and having lugs passing through apertures in the head, and nuts mounted on the threaded part of the rod for shifting the sleeve, substantially as set forth.

3. The combination, of a rod provided with a raised screw threaded part, a head having a neck for receiving the end of the rod and also provided with openings at the side of the neck, a key passing through said neck and through the end of the rod, a bearing-block in the head, a sleeve mounted to slide longitudinally on the rod, lugs on the end of said sleeve, which lugs pass through openings in the head at the side of the socket, the ends of said lugs resting against the bearing-block, and nuts on the screw-threaded part of the rod, substantially as set forth.

In testimony that we claim the foregoing as our invention we have signed our names in presence of two subscribing witnesses.

WILHELM BROCKHAUSEN.
FRIEDRICH BROCKHAUSEN.

Witnesses:
OTTO HANDTMANN,
FRANZ BALMANN.